INVENTORS
EVON C. GREANIAS
DONALD J. LEM
PHILIP F. MEAGHER
BY Robert C. Sandt
ATTORNEY 3,500,325

APPARATUS FOR SEPARATING CLOSELY SPACED CHARACTERS IN A CHARACTER RECOGNITION MACHINE

Evon C. Greanias, Chappaqua, and Donald J. Lem, Peekskill, N.Y., and Philip F. Meagher, Los Angeles, Calif., assignors to International Business Machines Corporation, Armonk, N.Y., a corporation of New York Filed Jan. 19, 1966, Ser. No. 521,703
Int. Cl. G02b 27/22
U.S. Cl. 340—146.3 10 Claims

ABSTRACT OF THE DISCLOSURE

In machine recognition of characters, a problem arises when two characters are closely adjacent or touching. It is necessary to establish a boundary between them so that each may be analyzed separately. This system in a first analysis of the touching characters identifies a zone within which the boundary lies and then examines details of those portions of both characters lying within the zone to determine precisely where the boundary should be. Once the boundary is established, the system is inhibited from considering the character portions beyond the boundary when analyzing a character.

This invention relates to character recognition apparatus, and more particularly to apparatus for separating or segmenting two closely adjacent or touching characters into their component characters by establishing an artificial boundary therebetween.

Frequently, characters on typewritten documents are irregularly spaced, causing adjacent characters to touch. or to be so closely spaced that the character scanner is caused to combine the characters into a single composite symbol. To recognize these characters correctly, a character recognition machine must be capable of isolating each character in succession to provide the raw data manifesting the shape of the isolated characters to the recognition circuits for appropriate processing. A simple segmentation of the characters by width determination is not alone enough, for even within a single font the width of the various lexical symbols varies greatly. The letter "*i*" is much narrower than the letters "W" or "M," to name but one poignant example. If, however, width segmentation is supplemented with a logical analysis of the configuration of the character lines that bound the space between the touching characters, the probable location of the interface between the two touching characters can be established. Once established, this interface then becomes the artificially established left boundary of the right-hand symbol, and the right boundary of the left hand symbol. This interface acts to blind the character scanner to any character fragments lying outside this boundary, and a unique isolated return for each symbol is thus made possible.

In a character recognition machine employing a curve follower type of scanner, closely adjacent characters tend to be bridged or joined by the scanner, which follows the outer perimeter of the character with a succession of small overlapping circles. Inherent in such a device is the tendency to bridge small gaps or discontinuities in a line. Closely adjacent, but not touching, characters would thus be joined by a scanner of this nature. It is the purpose of this invention, therefore, to establish an artificial boundary between closely adjacent or touching lexical symbols so as to isolate the scanning of each of the characters in succession.

A further object is to achieve segmentation of closely adjacent symbols by analyzing the configuration of the shape defined by the character lines which bound the space between touching characters.

Yet another object of the invention is to achieve segmentation of closely adjacent lexical symbols by analyzing fragments of both characters lying within a predetermined zone to detect the presence of given shape characteristics, and establishing the segmenting boundary with reference to the shapes thus found.

An even further object of the invention is to achieve segmentation of closely adjacent lexical symbols by performing a sequence of tests and adjusting the boundary location by the best of the tests.

Still another object of the invention is to provide in a curve follower type of character recognition device means for establishing a segmenting boundary between touching lexical symbols by testing the trace of the composite joined symbols for predetermined sequences, and persistence of trace directions within a zone containing fragments of both symbols, storing the location of the boundary upon the satisfaction of the predetermined sequence and persistence of slopes, and employing the stored boundary position to control the curve follower to follow the outline of only one character at a time and to index to a position, under control of the stored boundary location, to follow the next of the touching characters.

The foregoing and other objects, features and advantages of the invention will be apparent from the following more particular description of a preferred embodiment of the invention, as illustrated in the accompanying drawings.

For a detailed description of the apparatus shown as boxes in FIG. 1, reference may be had to the following issued patents assigned to the same assignee as the present invention, in which the features of the specific apparatuses are fully described and claimed as follows:

"Feature Tests and Recognition Logic," application Ser. No. 334,507—filed Dec. 30, 1963 U.S. Patent No. 3,303,465, issued Feb. 7, 1967

"Curve Follower," application Ser. No. 248,585—filed Dec. 31, 1962 U.S. Patent 3,229,100, issued Jan. 11, 1966

"Matrix Resolver," application Ser. No. 305,255—filed Aug. 29, 1963 U.S. Patent 3,248,699, issued Apr. 26, 1966

"Slope Detector," application Ser. No. 305,464—filed Aug. 29, 1963 U.S. Patent 3,297,988, issued Jan. 10, 1967

Figure 1:
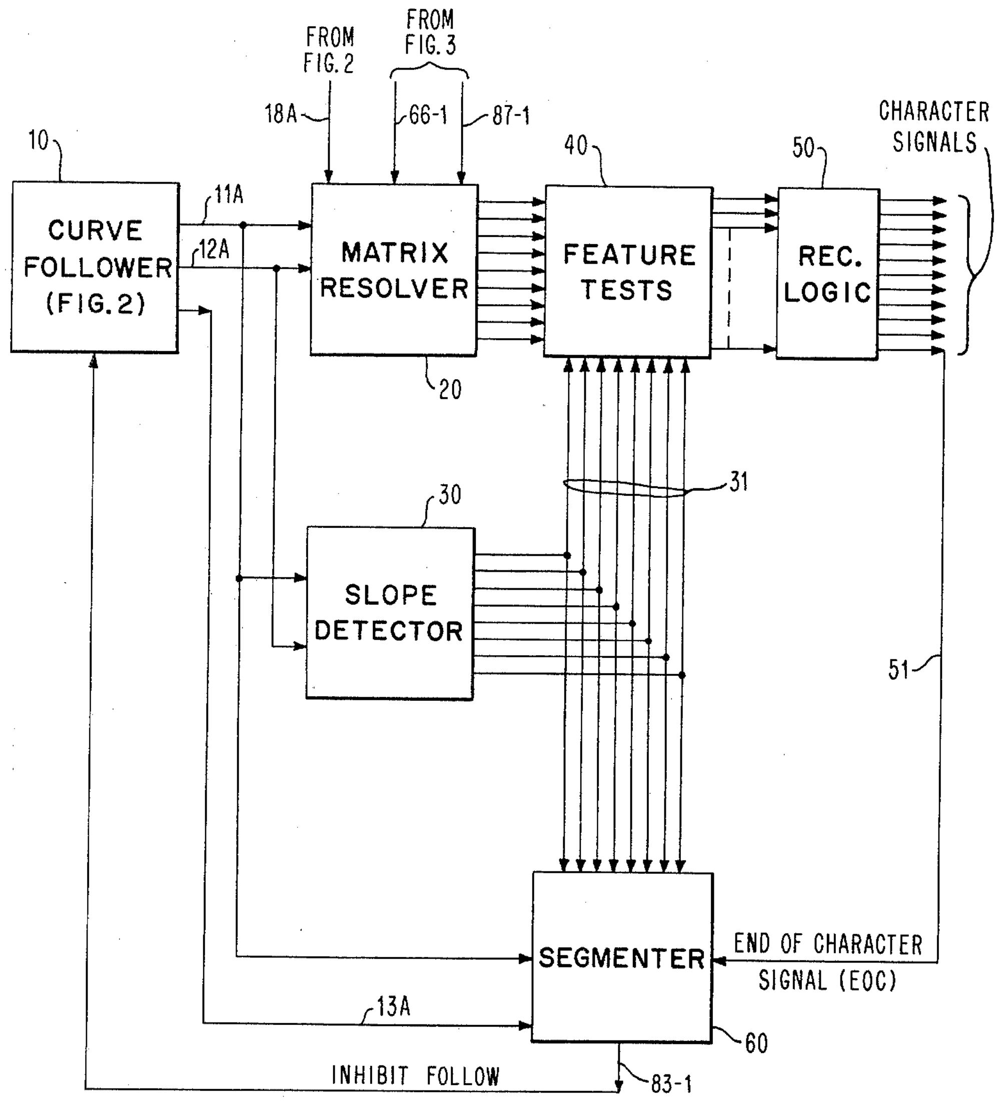
FIG. 1 is a schematic showing of the elements of a curve follower character recognition machine with the connections of the instant invention thereto.

In FIG. 1 sufficient elements of a character recognition apparatus are shown to enable one to understand the environment in which the present invention is most suited to operate. The curve follower 10 (shown in greater detain in FIG. 2) follows the outline of an imprinted lexical symbol and produces continuously varying electrical potentials on the lines 11A and 12A representing the horizontal and vertical displacements of the character trace, filtered of a dither signal which is necessary to effect the servo follower action. These voltages enter the matrix resolver 20, which normalizes the character to just fill a synthetic 4 x 5 matrix, or grid, and produces signals indicative of the instantaneous position of the trace on the grid by signals on one of four vertical lines and on one of five horizontal lines to signal the coordinates of the trace, much as one locates a city on a map.

The same horizontal and vertical displacement voltages appearing on the lines 11A and 12A are processed in the slope detector 30 to yield successive signals on one of the eight lines 31 to indicate in which of eight sectors, symmetrically disposed about the eight points of the compass rose (N, NE, E, SE, S, SW, W, NW) the instantaneous slope of the trace lies. The sequence and combinations of the matrix positions and slopes are tested in the feature test circuits 40 to produce recognition of features which are either generic to several characters or unique to one. These feature tests are performed as the character is followed. Upon completion of a circuit of the character, the feature tests are combined in the recognition logic 50 to produce the recognition signal indicative of the identity of the character and an end of character signal on line 51.

Necessarily in a character recognition system, as above outlined, successful recognition requires that one and only one character be followed at a time. If two characters touch, or are closely adjacent, the curve follower will treat them as one, and failure of recognition will result. Therefore, the segmenter 60, which is the subject of the instant invention comes into play to control the curve follower 10 to follow only one character of a touching pair by establishing an artificial boundary beyond which the curve follower 10 is blinded so as not to respond to any black character fragments.

Since it is assumed that touching characters occur by horizontal mis-alignment, the segmenter 60 receives only the horizontal displacement voltages appearing on line 11A. Further, because the segmenter must control the curve follower to follow touching characters both to the right and the left of the established boundary, it receives a further input on line 13A representing the gross displacement of the curve follower in following each character in a line. The voltages on lines 11A and 12A are reset at the end of each character, and reflect the shape of each character as it is followed. The voltage on line 13A, however, superimposes the voltage of line 11A on a pedestal voltage which positions the curve follower in following position next to each character, and is reset only when the follower returns to operate on a new line of characters.

The segmenter, in addition to operating on horizontal displacements, analyzes the shapes to determine when and where the boundary between touching characters shall be established. Therefore, it receives from the slope detector 30 the slope signals on lines 31 which it processes, in a manner to be described, to fix the location of the boundary.

Figure 2:
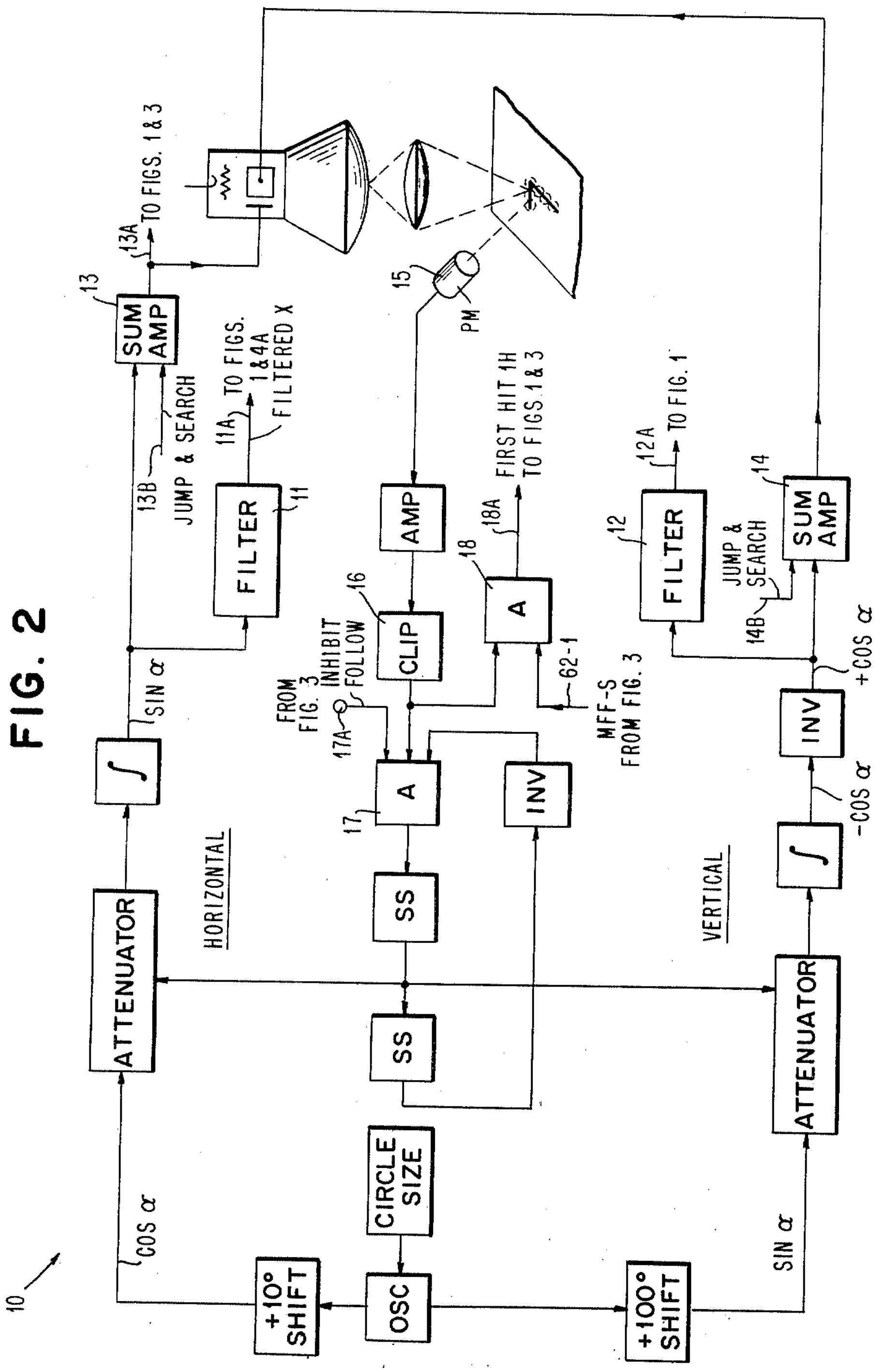
FIG. 2 is a detailed drawing of a curve follower with the additions necessary to connect the instant invention thereto.

Turning briefly to FIG. 2 which shows the elements of the curve follower 10 as described and claimed in detail in the referenced U.S. Patent 3,229,100, issued Jan. 11, 1966, the elements illustrated animate the beam of the cathode ray tube to image a spot of light upon the character to follow its outline. The trace is a series of overlapping circles superimposed on a slowly moving gross trace representing the character outline. The cathode ray tube receives its deflection voltages from the summing amplifiers 13 and 14 to which inputs at 13B and 14B are applied to position the beam in follower position for each successive character. The character defining voltages appearing on lines 11A and 12A are the result of filtering out the circular dither voltages (by filters 11 and 12) from the voltages that are applied to second inputs of the summing amplifiers 13 and 14 during the following action. The output 13A of the horizontal summing amplifier thus represents the total of the instantaneous horizontal displacements applied to deflect the cathode ray tube beam.

The photomultiplier tube 15 produces an output upon transition from white to black, which when amplified and clipped (in clipper 1) produces a pulse output for each such transition. This pulse output when permitted to pass AND 17 (by potentializing hub 17A) permits following to proceed. Thus, the absence of a potential on hub 17A will prevent following. The segmenter operates to control hub 17A so that when the follower seeks to exceed the boundary position the segmenter 60 removes potential from 17A to prevent the clipped black pulse from entering and affecting the follower circuits. Thus, even though the photomultiplier 15 could (and does) produce a black pulse, it is rendered ineffective if it occurs beyond the boundary. This causes the curve follower to ignore any black beyond the boundary.

As a point of departure for the explanation of the invention it will be assumed that suitable potentials have been applied to the hubs 13B and 14B of the summing amplifiers to position the spot in follower position adjacent to the rightmost extremity of the righthand character of a touching pair of characters, and that the curve follower has just initiated its following operation in a clockwise direction around the character. The outputs 11A and 12A are at zero potential at this instant in time. As the trace proceeds, the voltage levels of these terminals will vary in accordance with the trace. Since reading proceeds backwards, the horizontal voltage on line 11A will never go below zero, for the following always begins at the right extremity of a character. The vertical voltage on hub 12A may vary both positively and negatively with respect to the zero reset potential, as the origin of the follower action may be disposed at various positions within the height of a character.

On the first pass around the touching characters the segmenter 60 will analyze the relative displacement of the trace from the origin and will look for various shape characteristics within a zone where a character boundary should exist. If one of the requisite characteristic shapes is found within this zone, the voltage corresponding to the displacement of the boundary will be stored. This voltage then determines the maximum excursion of the character for inhibiting follower action beyond that boundary. The recognition circuits then function in their normal manner on the second follow around the character, using a derived stored width established on the first follow. On the end of the second follow, and successful recognition of the segmented righthand character, the stored boundary position is used to control the addition of voltage to the hub 13B of the horizontal summing amplifier 13 to cause the beam to jump to the boundary line, which is now the right boundary of the lefthand one of the pair of touching characters. The follower then switches to a search mode, using a vertical raster, to find the character fragment which abuts the boundary. The follower action then proceeds with the follower inhibit signal generated when the follower seeks to pass to the right of the boundary. Since the left-hand character does not touch on the left, no left-hand boundary will be established. The new matrix width, therefore, is the distance between the boundary and the leftmost character extreme, which width, stored as a voltage, operates the matrix resolver 20 in the normal fashion. When the character is identified, this stored voltage is used to control the addition of voltage to hub 13A to move the tracing beam to the left beyond the character just followed and begin its search for the next character.

Ignoring for the moment the circuits for producing the "store" signal, which cause the apparatus to store the horizontal displacement of the segmenting boundary, it will be assumed that such signal is available when needed. Therefore, the circuits for controlling the follower to inhibit following at the boundary, to jump over the just-identified character, to search for the next character, and to initiate the follower action will be first explored.

Certain signals will be used throughout the explanation. These are as follows:

*Filtered X.*—This is the analog voltage appearing on line 11A and represents the horizontal distance (to the left) from the point of intercept with the character, wherein following begins. This voltage is always positive, since the point of initial interception is the right-most extremity of the character.

*+V1.*—This is a DC voltage which represents .14" of horizontal displacement of the imaged spot of the cathode ray upon the document surface.

*+V2.*—This is a DC voltage representing .04" of displacement.

*Summer X.*—This is the analog voltage output at hub 13A which represents the total X deflection voltage applied to the cathode ray tube and the instantaneous displacement from the righthand margin of the document.

*Start Jump SJ*—This signal is the same as end of character and signifies recognition is complete and a jump movement over the character just identified is to be initiated.

*End of Jump EJ.*—This signal is produced when the beam has completed its jump over the previously identified character and initiates a start of search to look for the next character to be followed.

*1st Hit 1H.*—This signal is generated when the cathode ray tube is opreating in a raster scan search for the next character and makes the first intercept therewith.

*Hor Retrace HR.*—This is the time interval during which the cathode ray tube is returning from the left document margin to the right document margin to begin search for the right-most character of the next following line.

*MFF–F.*—This is the time interval during which the curve follower is following the character outline.

*MFF–S.*—This is the time interval during which the curve follower is operating in a raster scan search for the next following character.

For ease of understanding it is assumed that the apparatus reads from right to left, and that the follower follows clockwise around the character. It is further assumed that positive-going voltages produce a movement of the imaged spot on the page to the left. Other conventions employed will be developed as the explanation proceeds.

Figure 3:
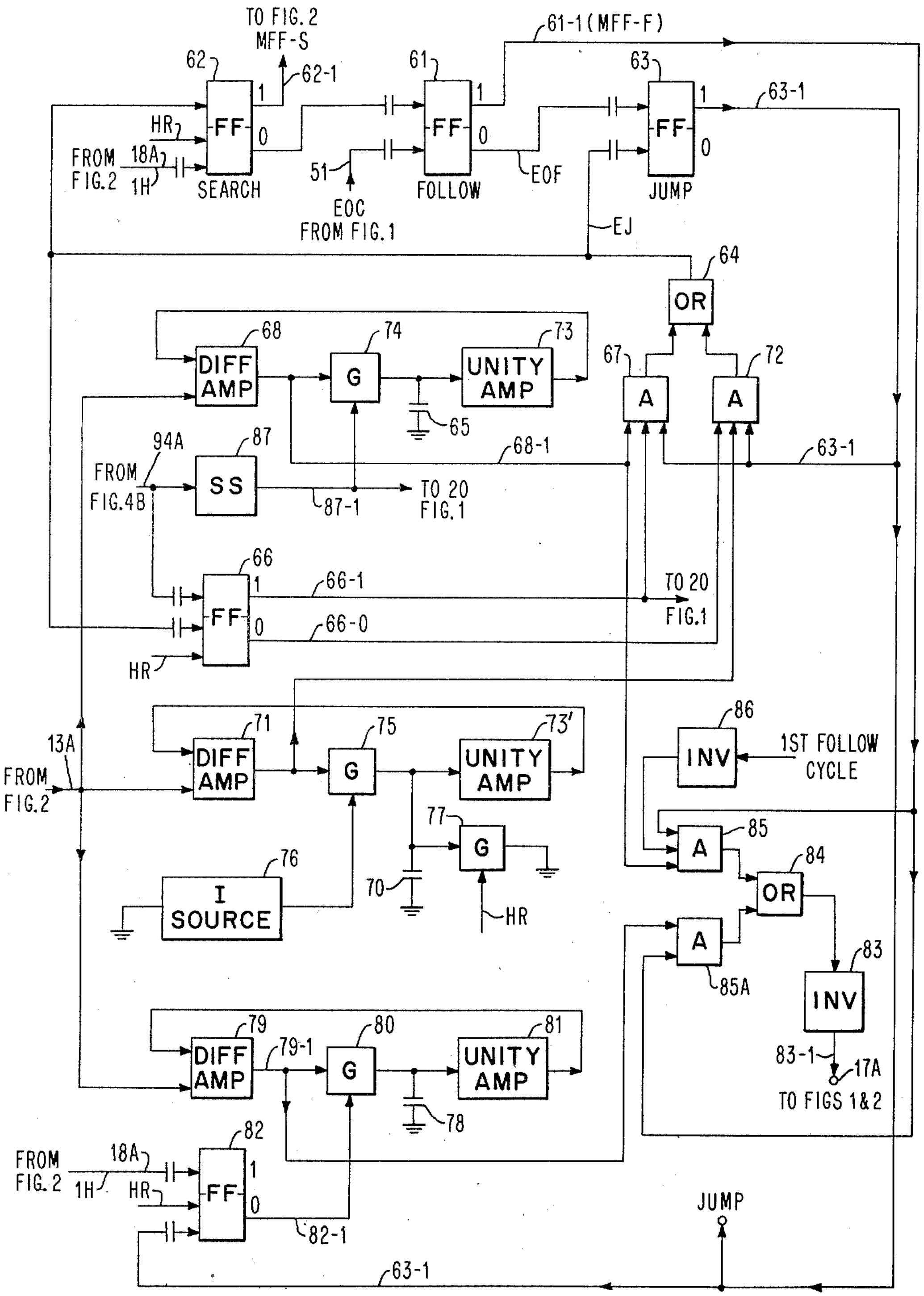
FIG. 3 is a schematic circuit diagram of that part of the instant invention necessary to effect the sequence of operations and to store the boundary and indexing displacements.

Proceeding first to the circuits for sequencing the basic functions of following, jump, and search reference is made to FIG. 3. Assuming, as we did above, that following has just been initiated, then in FIG. 3, trigger 61 will have been switched to the one state by the transition of trigger 62 to the zero state upon occurrence of the first hit signal 1H ending the search. The capacitive couplings between triggers is a convention employed to denote that the energizing pulse for the next coupled element is produced as the trigger enters the state. The lack of a capacitor indicates a steady control pulse for the duration of the trigger state. Thus, when trigger 61 is switched to the one state it produces an MFF–F signal output on line 61–1 continuously, signalling that the apparatus is operating in the curve follower mode, to either measure the character (first pass) or to identify the character (subsequent passes). When the character has been identified (or recognition has failed), the recognition logic 50 generates an end of character signal on line 51 which switches trigger 61 to the zero state cutting off the following in progress signal MFF–F on line 61–1. The reset of trigger 61 switches trigger 63 to the one state to produce a continuous jump in progress signal on line 63–1. When the curve follower has achieved the requisite jump movement to the left, signalled by a signal from the output of OR 64, trigger 63 will be reset to the zero state and trigger 62 switched to the one state. The output on line 62–1 is a continuous signal MFF–S denoting that the follower is operating in the search mode. When the first hit signal 1H occurs during the search mode trigger 62 is reset thereby to the zero state, its transition switching trigger 61 to the one state to complete the cycle. For ease of reference, the trigger 61 can be considered as the "follow" trigger, trigger 63 the "jump" trigger, and trigger 62 the "search" trigger, representing the three basic modes of operation.

Of the signals required to produce the foregoing sequencing of the triggers, only the end of character (EOC) signal has been treated. This, as stated, comes from the recognition logic. The first hit (1H) signal occurs when the apparatus is in the search mode (trigger 62 on) and the photomultiplier tube 15 (FIG. 2) encounters its first white to black transition in the search mode. This signal flows from clipper 16 (FIG. 2) through AND gate 18, now energized by the presence of MFF–S (FIG. 3) to yield the first hit signal and switch trigger 62 off. Since trigger 62 is only on during the search mode, all other black signals occurring during the follower mode will be prevented from generating first hit signals. The end of jump signal is generated by a combination of several conditions precedent. The follower must first be in the jump phase of its operation, and second, the horizontal displacement must have just attained the left-hand boundary of the character whose identification has just been completed. This requires knowledge of whether that character stood alone or was part of a touching pair. If it were part of a touching pair a "store" signal will have been generated during the preceding character analysis. The lack of such signal signifies a non-touching character.

The alternative conditions for the generation of the end of jump signal are generated by the circuits of FIG. 3. If touching characters exist, capacitor 65 will store a voltage which measures the horizontal displacement of the established boundary, and trigger 66 will be set in the one state by a store signal in the measurement of the previous right-hand one of the pair of touching characters. Therefore, when the jump trigger 63 is set, line 63–1 potentialized, trigger 66 in the one state, AND gate 67 will be finally energized whenever differential amplifier 68 singals that the displacement (summer X) is equal to or greater than the displacement stored in capacitor 65. This indicates that the follower has reached the boundary while it is in the jump mode, and needs to be stopped. This then fully activates AND 67 to produce an end of jump signal from OR 64.

Upon completion of recognition of a non-touching character there will be no store signal, and consequently no voltage storage in capacitor 65 that is usable to terminate the jump. Therefore, the maximum excursion of the follower in following the character must be used to terminate the jump. This maximum displacement is stored in capacitor 70. Differential amplifier 71 produces an output if the horizontal displacement voltage (summer X) exceeds the stored voltage on capacitor 70. This coupled with the presence of a jump in progress signal on line 63–1 and the absence of a store signal (trigger 66 in zero state) activates AND 72 to produce the end of jump signal through OR 64. Thus, the follower will jump to either the boundary, or in the absence of a boundary (no store), to the left-most position of the follower in tracing a non-touching character.

That the capacitor 65 stores the horizontal displacement of the boundary between touching characters and the capacitor 70 stores the maximum displacement of the follower in following a non-touching character has been stated. How these voltages are accumulated has not been explained. The summer X voltage on line 13A (from FIG. 2) enters differential amplifier 68 together with the capacitor voltage (via unity amplifier 73), where they are compared, and a positive voltage generated if the summer X voltage exceeds the charge on capacitor 65, and vice-versa. The capacitor 65 will thus be charged or discharged to the voltage level of the difference amplifier 68 whenever gate 74 is closed. The purpose of the unity amplifier 73 is to provide a high impedance load for capacitor 65 to prevent its discharge when its stored voltage is being utilized. When the conditions precedent for a boundary location are found, a store signal will be generated to set trigger 66 and fire single-shot 87. Trigger 66 will set on the first store signal and remain set. Single-shot 87, however, will fire on successive store signals, if they should occur, and will close gate 74 to store the summer X voltage at each store position. Thus, capacitor 65 will store the position corresponding to the last store signal. This permits the apparatus to store the last found and best boundary position.

The charging circuit for capacitor 70 differs from the above charging circuit, in that it accumulates maximum displacements. This is accomplished by matching the X displacement voltage on line 13A in difference amplifier 71 against the voltage in capacitor 70 (via amplifier 73'), which difference amplifier produces a positive output if the displacement voltage exceeds the capacitor charge to open gate 75 to admit more charge to capacitor 70 from current source 76. Gate 75 remains open until the capacitor charge is equal to or exceeds the displacement voltage. The capacitor 70, therefore, follows only positive excursion of the displacement and thus stores the maximum prior excursion of the follower. The capacitor 70 discharges through gate 77 which closes during the horizontal retrace signal when the cathode ray tube beam is moved to the right and down to start operation upon the next following line of print.

Capacitor 78 stores the right-hand boundary of a character and is used to inhibit following over the established boundary when the follower 10 is following the left character of a touching pair. Its charging circuit is similar to that for charging the left boundary storage capacitor 65, proceeding through difference amplifier 79 which yields a positive output if the capacitor 78 has a greater voltage charge (as fed through unity amplifier 81) than the X displacement voltage from the X summer output 13A. The capacitor follows the X displacement voltage (so long as gate 80 is closed). Gate 80 is closed via line 82–1 when trigger 82 is reset to the zero state by the capacitive coupling thereto from the jump trigger line 63–1. Switch 80 opens when trigger 82 is switched to the one state by a first hit signal 1H from AND 18 (FIG. 2). Since the first hit always occurs on the right-most fragment of a character, capacitor 78 will store the displacement of that hit.

As has been explained in detail, capacitor 65 stores a voltage representing horizontal displacement of the boundary between two touching characters, if such boundary were in fact established. Capacitor 70 stores the left-most extreme displacement of a free-standing character, or the left-most extreme position of the left character of a touching pair. Capacitor 78 stores the right-most extreme displacement of a character, which displacement will be coincident with the boundary location when the follower is operating on the left character of a touching pair. Thus, capacitors 65 and 78 define the boundaries of touching characters beyond which character following should be inhibited. Capacitor 70 acts solely to provide an end of jump detection when there are no touching characters.

The inhibit follow control is vested in AND gate 17 (FIG. 2). Removal of potential from hub 17A prevents the follower from responding to black signals beyond that point. Hub 17A is normally potentialized from inverter 83 (FIG. 3) which has no input thereto unless an inhibit follow condition is generated by OR gate 84 during the follower mode. Following must be inhibited when following the right-hand character of a touching pair during the follower mode only when the apparatus is functioning to identify the character, not during the first or measuring pass around both characters. Were the inhibit condition set up immediately upon the establishment of the boundary, the follower could become stranded. This could occur because the boundary is frequently established when the follower is following the left-hand character. If the inhibit condition were permitted to arise immediately, the follower would be blinded to black beyond the boundary. Since it had been following a character fragment which now lies beyond the boundary, it would now "see" only white, and thus have no line to follow. It would, therefore, sit at this position motionless, except for its small circular dither which could now provide no black interception. By delaying the inhibit action until the second follow cycle, the follower will follow around both characters and return to its point or origin (first hit position). Then, upon entry into the second follow cycle, and subsequent cycles, the inhibit will be active.

When following the left-hand character of a touching pair, wherein the boundary has previously been established, the inhibit follow control by the right boundary must be active during all follow cycles. The inhibit follow control, as explained above, comes from OR 84. The left-hand boundary inhibit control requires that AND 85 be energized. This receives one input from difference amplifier 68 if the summer X voltage on 13A exceeds the stored boundary position in capacitor 65. It receives a second input from inverter 86, which yields an output for all modes of operation other than the first follow cycle. The third input to AND 85 is from line 61–1 signifying that the apparatus is operating in the follower mode. Thus, if in a second or third (NOT first) follower cycle, the left boundary is reached, AND 85 yields an output to OR 84 to produce the inhibit follow control. The counterpart inhibit control for the right boundary is through AND 85A which receives one input from line 61–1 (MFF–F signal) and a second from the line 79–1 which is potentialized if the stored right boundary voltage exceeds the summer X displacement voltage. Thus, the right boundary is active during all follower cycles to inhibit follow.

Returning now to the operation of the apparatus in following a touching pair of characters, and approaching the explanation from a displacement viewpoint, the cycle begins (as before) at the first hit on the right extreme of the righthand character. Capacitor 78 stores this position, as the first hit signal (1H) sets trigger 82 to open gate 80. As the follower follows around both characters, capacitor 70 will accumulate more and more charge, ending up with a charge equal to the displacement of the left-most fragment of the touching characters. As the following proceeds and a touching situation is detected, the store signal is generated to store the boundary, which now becomes the left boundary of the right character. The follower continues to follow the composite characters without inhibition of the following until it returns to the point of origin (1st hit position). On the second and subsequent follows around the character, which are recognition cycles, the inhibit follow action comes into action. Thus, when on the second pass the follower seeks to go beyond the boundary established in the first pass, the follower will be blinded to black, and the follower will follow only the right character. Upon completion of the second pass and production of an end of character signal, the follower will jump until its displacement equals the boundary voltage stored in capacitor 65. Capacitor 65 has now satisfied its mission and is receptive to receive a new left boundary. Capacitor 78, however, has been following the jump movement and continues to follow the horizontal excursions during the search movement. When the first hit occurs, and this will occur on the boundary, gate 80 opens and capacitor 78 then stores the boundary location. It is now available to inhibit following action on the right. As the following action proceeds in the first pass, capacitor 70 will accumulate no further charge, as it has already stored the left position of the left character of the touching pair. Since no further touching is assumed to occur, although the apparatus will work for successive touchings, there will be no store signal and capacitor 65 will continue to follow the trace. When the follower returns to the first position and enters its second following cycle the capacitor 78 prevents following to the right of that boundary. When the recognition is complete, the jump now proceeds to the position determined by capacitor 70 which stores the left extreme of the left character. Search and follow of the next character then proceeds.

Before proceeding with an explanation of the development of the store signal, thereare a few necessary further explanations of the circuits and the operation thereof. The means for counting the follow cycles are set forth in detail in U.S. Patent 3,303,465, issued Feb. 7, 1967, and assigned to the same assignee as the present invention. These are obtained from a counter which is incremented by one count upon each return of the follower to the point of origin, as detected by the return of the hubs 11A and 12A to zero voltage.

A further point requiring clarification is the manner in which the character width is established for use in the matrix resolver 20. Normally this device stores the maximum width of a character. However, when characters touch, the width which would be stored in the resolver would be the combined width of both characters. This, if stored, would yield erroneous recognition, as it would confine the normalization of the character to only half the matrix. To overcome this difficulty, which arises only as to the right character of a touching pair, the operation of the resolver 20 must be modified. The simplest solution is to delay the recognition by one cycle if a store signal has been generated, and make a second pass around the now segmented character with the inhibit follow controls active. The width storage will now become the width of the right character up to the boundary, and the matrix resolver circuits 20 will operate in their normal fashion. Recognition would then be effected in the third (and fourth, if needed) cycle. A second expedient that can be employed is to use a circuit similar to that for charging capacitor 65 in the matrix resolver circuit 20, which charging circuit will be controlled by the voltage on line 11A of FIG. 2 and by each successive store signal coming from single-shot 87 (FIG. 3), which signal will close a gate to charge or discharge the capacitor to store the voltage for each newly signalled boundary location. This capacitor is discharged upon a first hit signal, so as to be receptive to a new charge for each new character. If a store signal has been generated in the first follow around the character, the latch 66 will control the use of the segmented width storage capacitor in the matrix resolver 20 via line 66–1. If no store has been effected, line 66–0 will control the full width character storage capacitor in matrix resolver 20 to normalize on the full width. This latter expedient saves one follower cycle.

The jump and search voltages which are applied to the summing amplifiers 13 and 14 are controlled by the appropriate ones of the triggers 63 and 62. When the jump trigger 63 is ON (one state), the potential of line 63–1 gates a circuit to charge a capacitor from a current source until the end of jump signal terminates the charging action. The voltage of that capacitor, when applied through a high impedance unity amplifier to hub 13B of the horizontal summing amplifier 13, causes the beam to jump from character to character and hold during the search and follow operations. The search voltages applied to hubs 13B and 14B are raster scan potentials, and are the same for all characters. They are gated as modulants for the character positioning signals (frozen at end of jump) by the MFF–S (search in progress) signal on line 62–1.

Figure 4A:
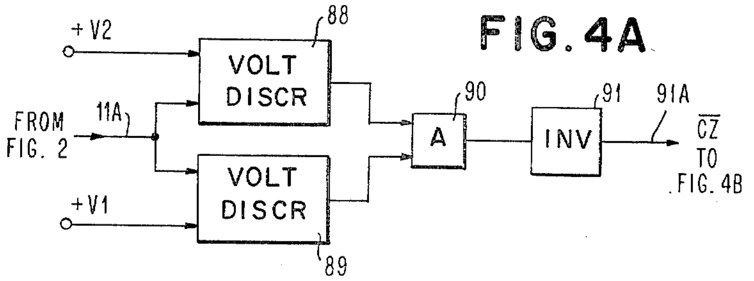
FIG. 4A shows the circuit for detecting and signalling the interface zone.

The production of the store signal which indicates that the conditions for touching characters have been established and that the location of the boundary or interface has been fixed, depends upon displacements and shape analyses. Assuming that typewritten characters are being analyzed, and that the typewriter has a .1 inch horizontal pitch, the apparatus is preferably set to look for features which distinguish a boundary condition only in a zone which is .1 inch wide, with its right edge located .04 inch from the right extremity of the character. Since the filtered X voltage appearing on line 11A is always reset to zero at the first hit on the right extreme of a character, the voltage variations of line 11A, therefore, represent the displacement of the tracing beam while following a character to the left of the origin. If this filtered X voltage is compared against voltages representing the zone limits, the presence of the trace within the zone can be detected. Circuits for performing this function are shown in FIG. 4A wherein the filtered X voltage appearing on line 11A (FIG. 2) enters the voltage discriminators 88 and 89. Discriminator 88 compares the displacement voltage with a voltage V2, which represents a beam displacement of .14 inch, and if the displacement is less than .14 inch, discriminator 88 yields an output indicating the displacement is to the right of the margin of the zone. Discriminator 89 compares the displacement against a voltage V1, which represents a displacement of .04 inch, and if the displacement is greater than .04 inch, discriminator 89 yields an output. If both discriminators 88 and 89 yield outputs, indicating that .14 inch is greater than the displacement and that the displacement is greater than .04 inch, then AND 90 is energized to manifest that the tracing beam is operating within the zone, called the "cusp zone." The inverter 91 provides a not cusp zone signal ($\overline{CZ}$) for uses to be set forth. Thus, the sole use for the filtered X displacement voltage is to establish a zone in which to look for features which distinguish a touching situation.

The characters are analyzed by looking for predetermined sequences and persistences of slopes. The slope signals come from the slope detector 30 (FIG. 1) as a signal on one of the eight lines 31 which enters the segmenter 60. These signals are labelled with the points of the compass rose, N, NE, E, SE, S, SW, W, and NW and indicate by their presence that the follower is proceeding in a direction that lies within the 45° sector which is disposed symmetrically about the compass point which is signalled. In the drawings the convention will be employed that the logical OR function is denoted by a + sign between the alternative entries that will effect the requisite operation. The logical NOT function is denoted by a bar over the entries whose absence will effect the operation of the circuit element. These conventions simplify the drawings by omitting repetitious OR gates and inverters, tending to make the explanation more lucid.

Figure 4B:
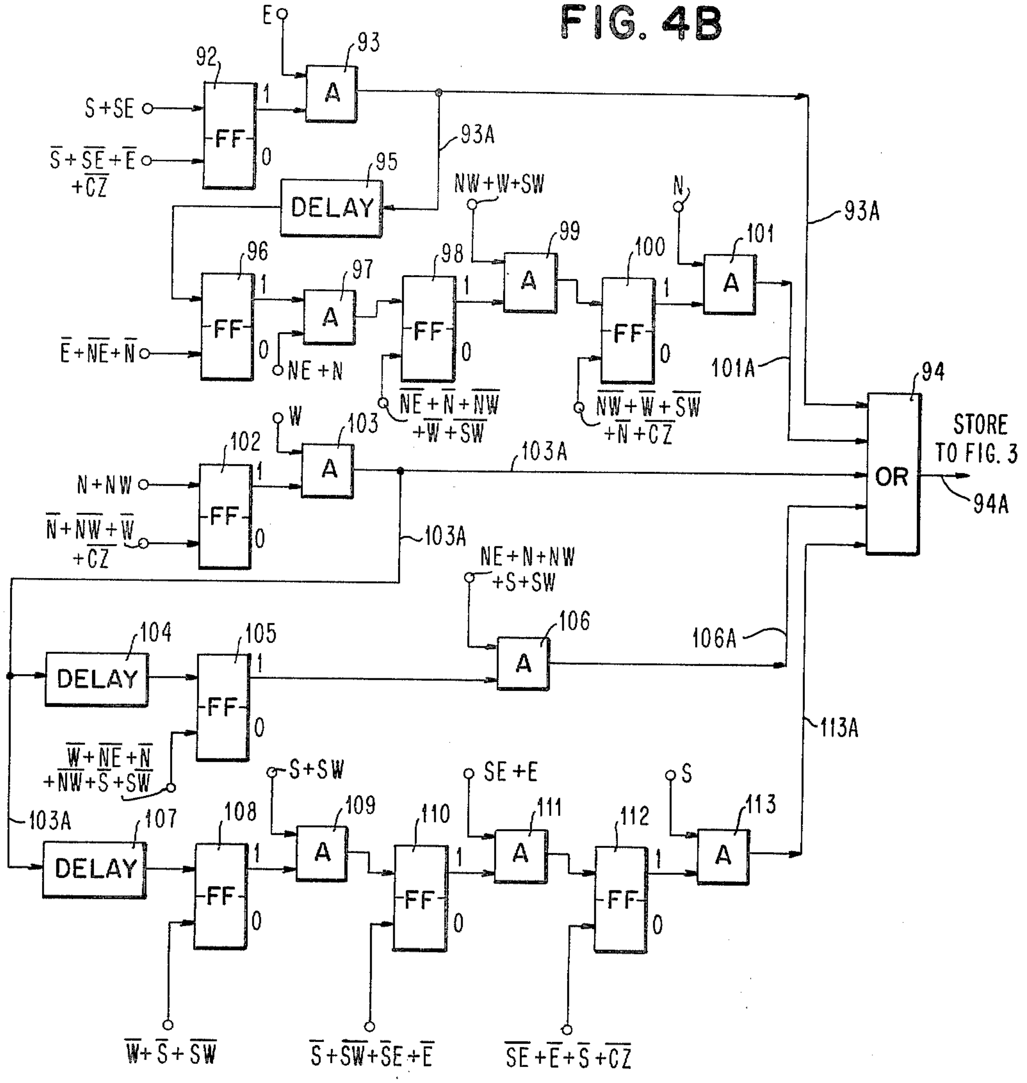
FIG. 4B shows the feature test circuits for testing for shape characteristics within the interface zone.

Before examining the circuit of FIG. 4B, it is well to repeat the statement that the apparatus looks for, and stores, the best boundary location. Thus, during a following operation several potential boundary conditions may be found. The last-found, and more stringent conditions, for a boundary location will control the storage of the boundary location. For example, an output from AND gate 93 (FIG. 4B) will energize OR 94 to produce a "store" output on hub 94A. The same AND 93 feeds the serial chain of elements starting with delay 95 and terminating with AND 101. If the conditions subsequent to those for energizing AND 93 are satisfied to pass the serial chain, then two store signals will be generated. The last one (from AND 101) will determine the voltage store in capacitor 65.

The first condition for a store signal is the sequence tested by the trigger 92 and the AND gate 93. These elements test for the occurrence of a top cusp within the cusp zone, as measured by the circuit of FIG. 4A. A top cusp is an upward pointing reentrant shape. The sequence tested is a south or southeast heading followed by an east heading, all within the cusp zone. This is achieved by connecting the S and SE lines in the group of lines 31 (FIG. 1) from the slope resolver 30 as "ORed" inputs to the set (one) side of trigger 92, and combining the output of trigger 92 with an E (east) signal in AND 93. So as to prevent this sequence from occurring at unwanted times, trigger 92 is reset by the not cusp zone signal $\overline{CZ}$, or any heading other than S, SE, or E (denoted by $\overline{S}+\overline{SE}+\overline{E}$) applied to the reset input of trigger 92. Such a sequence of events would occur, for example, if a one and a five were touching at the bottom. The signal to store would occur as soon as the trace turned east following a southerly progression down the right side of the one. The trigger 92 would have been reset prior to its southern movement by the northerly trace up the left side of the one. The boundary would thus be set slightly to the right of the bottom of the one.

The one-five pair of characters, however, is subjected to further tests to bring about a more definitive boundary location so as to prevent cutting off the top of the one if it should have a clockwise slope. This further test includes the previously mentioned serial chain of elements starting with delay 95 and ending with AND 101. This chain looks for a persistent east followed by a north or northeast, followed by a northwest or west or southwest, followed by a north without intervening headings in conflict with that sequence. The second store signal occurs when the trace turns north. In the one-five conflict, the store signal occurs after the trace has undergone a persistent east on the upper trace of the bottom tail of the five, turned northeast, north, northwest and west as it traces the inner curve of the tail and then turns north to activate the store. This sets the interface or boundary to the left of the handle of the sickle, which constitutes the bottom of the five.

The foregoing sequence for the one-five test is achieved by feeding the output from AND 93 through a delay 95 having a delay time of approximately .1 millisecond which corresponds to .02 inch of movement of the follower at the tracing speed. This then requires that the east progression persist for at least .02 inch before the next event. Delay 95 sets trigger 96 whose output is combined in AND 97 with a northeast or north input from slope resolver 30 (FIG. 2) to set trigger 98. This trigger's output is combined in AND 99 with heading inputs of NW or W or SW to set the final trigger 100 to provide the requisite input, together with a N heading, for AND 101 to provide the second store signal input to OR 94. The second output from OR 94 fires singleshot 87 (FIG. 3) to charge the voltage stored in capacitor 65 to the boundary displacement determined by the further test. Capacitor 65 holds this charge to provide the inhibit follow control previously described.

It will be noted that each of the triggers in the serial chain just described is reset upon any heading other than those required to set each respective trigger and the next following trigger in the chain. Thus, trigger 96 resets on $\overline{E}$ (E required to set it) or $\overline{NE}$ or $\overline{N}$ (NE or N required to set latch 98). Latch 98 resets on ($\overline{NE}+\overline{N}$) or ($\overline{NW}+\overline{W}+\overline{SW}$), the parentheses denoting the converse conditions for setting itself and the next latch 99 respectively. Latch 100 resets on ($\overline{NW}+\overline{W}+\overline{SW}$) or ($\overline{N}$) or on $\overline{CZ}$ (the not cusp zone signal from inverter 91). Thus, all of the triggers 92, 96, 98, and 100 must be set in sequence before the trace gets out of the cusp zone, for the $\overline{CZ}$ signal on the reset side of trigger 100 will block the switching thereof by an output from AND 99.

A similar progression of tests for bottom cusp characteristics is performed by the circuits starting with trigger 102. In this case three possible conditions can exist all originating with the sequence north or northwest followed by a west, resulting in the energization of AND 103 and production of a "Store" output from OR 94. This condition would exist for a five-seven conflict where the two horizontal bars are joined. As stated, trigger 102 is set by an "ORed" input of N or NW reset by any heading other than N, NW, or W or by a $\overline{CZ}$ (outside of cusp zone) signal from 91A (FIG. 4A). Thus, for a five-seven conflict, this test would produce a store as the trace turned west after ascending the left side of the vertical leg of the seven and entered the cusp zone. This would yield a horizontal bar on the seven of .04 inch (right cusp zone limit). So as to stretch this bar as far as possible, further tests are performed. These tests proceed from AND 103 to delay 107 which delays the output from AND 103 by .35 millisecond corresponding to .07 inch of character width. If west persists for .07 inch, then trigger 108 will be set by the output from the delay 107, trigger 108 reseting on $\overline{W}+\overline{SW}+S$. If trigger 108 is set and a south or southwest heading entered into AND 109 gate 110 will be set. Gate 110 together with a SE+E (ANDed in AND 111) sets trigger 112, which in turn provides an output from AND 113 if an S entry is made thereto. The second store signal from OR 94 will result from this sucsion of events.

The foregoing succession of events produces a second store signal for a five-seven conflict when the trace rounds the outside of the curve of the five proceeding south. This preserves the maximum information as to both the five and the seven, setting the boundary just to the right of the vertical tangent to the curve of the five. It will be again noted that each of the triggers 108, 110, and 112 resets on the absence of the headings required to set itself and the next succeeding trigger in the chain. In addition, trigger 112 resets on a $\overline{CZ}$ thus requiring that the sequence of events all occur before the trace gets outside of the cusp zone. The other resets will destroy the sequence if one of the required reset headings signals occurs before the latch set is utilized.

The final test proceeding from AND 103 proceeds through delay 104, having a .1 millisecond (.02 inch) delay, requiring that west persist for .02 inch. Following this, latch 105 will be set at the end of the delay. It in turn will yield a "Store" signal if a NE+N+NW+S+SW (logical OR) condition exists as a second input to AND 106. This signals the store signal at the end of a long west interface when the trace turns in any direction except west, east, or southeast, fixing the boundary at the instant of change. This sequence would segment a one-seven conflict, for example. In this instance the sequence N+NW, long W, and S would satisfy the latches 102, and 105 and AND 106 to produce the requisite segmentation.

From the foregoing explanation it will be seen that with five inputs to OR gate 94, it is possible to generate the store signal for the segmenting boundary in accordance with any one of five conditions precedent or with two successive sets of conditions. In this latter instance the second occurring store signal controls the boundary position, as it is designed to be a better or more stringent test. For example, if a pulse occurs on line 101A it must have been preceded by a pulse on line 93A, for AND 93 is a prerequisite to the operation of the chain of elements terminating in AND 101. So, too, if a pulse appears on either 106A or 113A, line 103A will have emitter a prior pulse. A further possibility is a pulse on line 103A, followed by one on 106A, followed by one on 113A. In this case, the voltage storage on capacitor 65 will charge once for each pulse, to thus reflect the latest information as to the best boundary position.

While the basic character recognition apparatus disclosed and claimed in the referenced copending application was designed primarily for the recognition of handwritten numerals, it will be appreciated that the regularity of typewritten numerals offers less problems of recognition. So, too, have the instant circuits been designed primarily for segmenting touching number pairs. It is evident, however, that the same shape features that bound an interface between touching numbers can also be found between touching pairs of alphabetic characters, and that, therefore, the principles of the invention can equally well be applied to any touching pairs of lexical symbols. The concept of analyzing shape characteristics within a zone including portions of both characters of a touching pair and setting the segmenting boundary with respect to predetermined shape characteristics has universal application.

What is claimed is:

1. In a character recognition machine, means for establishing a segmenting boundary between two adjacent touching characters, comprising:
   (a) means for establishing a zone including touching portions of both characters;
   (b) means for analyzing the configuration of the portions of both characters within the zone and manifesting analysis results;
   (c) and means responsive to the manifestation of analysis results for establishing said boundary to segment the characters into two separate characters for individual identification.

2. The apparatus of claim 1 wherein said means for analyzing and manifesting analysis results includes a plurality of analyzers each being operative to test for specified character features and, when said specified features are detected, to manifest successful completion of said test, some of said analyzer tests being more stringent than others, the more stringent tests requiring detection of greater numbers of specified features, and said means responsive to the manifestation of analysis results for establishing said boundary being operative responsive to the analyzers manifesting test completion and having the most stringent test requirements of all analyzers manifesting test completion.

3. In a character recognition machine having a curve follower for following the outline of an imprinted lexical symbol and producing time variant electrical waveforms representing the successive displacements of the follower in following the symbol, which waveforms are continuously tested for the presence and absence of predetermined characteristics to produce an identification of the symbol followed, means for establishing a segmenting boundary between closely adjacent symbols and for controlling the follower to follow each separate symbol in succession, comprising:
   (a) zone defining means operative responsive to at least one of said waveforms for establishing a zone between each pair of closely adjacent symbols, and producing a signal manifestive of the presence of the follower within that zone which zone contains portions of both symbols;
   (b) means for analyzing said waveforms for the presence of predetermined sequences of characteristics defining given shapes of portions of both characters and producing signals indicative of the shape identified;
   (c) means responsive to the signal manifestive of the presence of the follower within the zone and to the shape identifying signals for storing the displacement of the segmenting boundary between the symbols, and
   (d) means for comparing the follower displacement, as manifested by at least one of said waveforms, with the stored displacement of said boundary and preventing the follower from following any portions of a symbol lying beyond the boundary.

4. In a character recognition machine having a curve follower for following the outline of a succession of imprinted lexical symbols and producing time variant electrical waveforms manifestive of the successive orthogonal displacements of the follower in following each successive symbol, and for deriving signals indicative of the successive slopes of the follower's trace, which slopes are analyzed together with the displacement signals to effect the identification of the character, means for establishing a segmenting boundary between closely adjacent character pairs, and for controlling the follower to follow each character of the pair in succession comprising:
   (a) inter-character zone defining means for comparing fixed zone limit voltages with the electrical waveform manifesting the horizontal trace of a character, and producing a signal indicative of the presence of the follower within the zone, the zone limit voltages having values which establish the limits of the zone to include portions of each character of a closely adjacent pair;
   (b) means under control of said zone presence signal and said slope signals for testing the slope signals for a plurality of predetermined sequences and durations of given ones of said slopes, and producing signals indicative of the success of each respective test;
   (c) means controlled by the last-occurring one of said test success signals for storing the instantaneous value of the waveform manifesting the horizontal displacement of the follower at that instant;
   (d) means under control of the stored displacement value for controlling the follower to follow only those character portions lying on a first side of said boundary, whereby the first character of said pair is identified,
   (e) and means operative upon the completion of identification of the first character of said pair and under the control of said stored displacement value for positioning said follower on the second side of said boundary, and to control the follower to follow only those character portions lying on the second side of said boundary, whereby the second character of said pair is recognized.

5. The apparatus of claim 4 wherein the means for testing the slope signals for predetermined sequences and durations comprises a plurality of chains of bi-stable triggers having a set and a reset condition and logical AND gates interconnecting the triggers in each chain to effect successive switching thereof to the set condition in response to the set condition of the prior trigger in the chain and the occurrence of predetermined ones of said slope signals, at least one of said triggers in said chain having a connection with said zone presence signal to be reset by the absence of said signal to destroy the sequencing of said chain when the trace of said follower exceeds the limit of said zone.

6. The apparatus of claim 5 wherein the respective ones of said chains of triggers are provided with given slope inputs and slope persistence responsive circuits that define successively more stringent tests for the boundary location, the chain of triggers being so constructed and arranged as to provide test success signals in a sequence corresponding to the stringency of the test, whereby the last-occurring test signal will control the storage of the boundary location at the most definitive position.

7. The apparatus of claim 4 wherein the means for storing the instantaneous value of the waveform manifesting the horizontal displacement of the follower upon the occurrence of the last test signal comprises a capacitor charged under control of said waveform to a voltage level equal to the voltage level of said waveform at the instant of the occurrence of said test signal and an amplifier having a high impedance input connected to said capacitor and operative to produce an output equal to the capacitor voltage charge without dissipating the charge on the capacitor.

8. The apparatus of claim 4 wherein said means under control of the stored displacement value for controlling the follower to follow only those character portions lying on a first side of said boundary comprises means for preventing the curve follower from responding to any black line fragments lying beyond the boundary.

9. The apparatus of claim 4 wherein said means operative upon the completion of identification of the first character and under control of said stored displacement value for positioning said follower on the second side of said boundary, and to control the follower to follow only those character portions lying on the second side of said boundary, includes means for moving said follower in a direction from said first side of said boundary and for comparing the stored value with the value of the electrical waveform manifesting a corresponding orthogonal displacement and stopping the movement of said follower when the stored value equals orthogonal displacement value manifested by the compared waveform.

10. The apparatus of claim 9 including further means responsive to the stopping of the movement of said follower at said boundary for controlling the follower to search for and follow the character lying on the second side of said boundary.

References Cited

UNITED STATES PATENTS

| | | | |
|---|---|---|---|
| 3,111,646 | 11/1963 | Harmon | 340—146.3 |
| 3,199,080 | 8/1965 | Rabinow et al. | 340—146.3 |
| 3,303,466 | 2/1967 | Holt | 340—146.3 |
| 3,344,399 | 9/1967 | Bonner | 340—146.3 |
| 3,234,511 | 2/1966 | Brost et al. | 340—146.3 |
| 3,164,806 | 1/1965 | Rabinow | 340—146.3 |
| 3,219,974 | 11/1965 | Rabinow | 340—146.3 |
| 3,231,860 | 1/1966 | Chaffen | 340—146.3 |
| 3,276,008 | 9/1966 | Hauerbach | 340—146.3 |
| 3,305,832 | 2/1967 | Griffin | 340—146.3 |
| 3,309,668 | 3/1967 | Ingham | 340—146.3 |

THOMAS A. ROBINSON, Primary Examiner